Patented Apr. 7, 1925.

1,532,503

UNITED STATES PATENT OFFICE.

HARAI R. LAYNG, OF SAN FRANCISCO, CALIFORNIA, HATTIE F. LAYNG, ADMINISTRATRIX OF SAID HARAI R. LAYNG, DECEASED.

CHLORIDIZING VOLATILIZATION PROCESS.

No Drawing.   Application filed July 27, 1921.   Serial No. 487,995.

*To all whom it may concern:*

Be it known that I, HARAI R. LAYNG, a citizen of the United States, residing at the city and county of San Francisco and State of California, have invented new and useful Improvements in Chloridizing Volatilization Processes, of which the following is a specification.

My invention relates to the treatment by chloridizing volatilization methods of ores, mixtures or compounds hereinafter referred to as "ore," which contain a valuable element or elements hereinafter referred to generally as "values."

The main purpose of my invention is to provide an efficient method for treating ore. Other purposes are: To provide a method for reducing the amount of time, labor, fuel, power and chloridizing agents heretofore required by chloridizing volatilization processes; to provide an efficient method for increasing the extraction of values from certain ores which heretofore could not be treated by chloridizing volatilization methods.

Heretofore in certain attempts by others to conduct chloridizing volatilization, the ore has been mixed with a chloridizer such as salt or calcium chloride or mixtures thereof, and charged into a furnace where the mixture was heated to volatilize the values. Such a procedure usually caused high fuel consumption, high labor and power costs, and required considerable time, namely, about forty-five minutes to over sixty minutes, and furthermore required the use of excessive amounts of chloridizers.

The above methods when applied to some ores having a silicious gangue without appreciable quantities of bases, like calcium or iron, which bases have a tendency to prevent the rapid escape of the chloridizer, usually resulted in very poor extractions of the difficult volatile elements, like silver, owing to the fact that the chloridizer would be volatilized before attacking the silver to a practical extent, therefore attempts heretofore to treat such ores by the said methods have resulted in failure.

In the case of an ore having the following approximate composition: 77.88% silica and silicates of alumina, 1.48%, calcium carbonate 5.557%, lead carbonate, 2.575%, lead sulphate, 9.0%, oxides of iron and aluminium, 3.54 oz. silver per ton, and 3.27% water, and in which only apparently the silver was combined with silicate of alumina, attempts to treat the ore by the prestated methods did not result in better than sixty per cent. extraction of the silver, and in most cases less than fifty per cent. even though as high as twenty per cent. by weight of various chloridizers were used and even though numerous modifications of the application of the methods were tried and furthermore even though the ore was ground to as fine as 200 mesh. Whereas, with my process to be described hereinafter, in the case of a large furnace with similar ore crushed only to pass a $\frac{1}{4}''$ screen, using only about four per cent. chloridizer and allowing only about ten minutes of heat treatment, the extraction of the silver was much greater than any which could be obtained by other methods even though in the large furnace test the temperature was considerably lower than that shown by laboratory tests to be the best temperature. In one test on this ore mixed with ten per cent $CaCl_2 2H_2O$ and 10% water and charged into a heated furnace and heated to about 1760° Fahrenheit in about five minutes, then to 1800° F. at the end of another five minutes and held about 1800° for twenty-five minutes, and up to over 1900° at the end of another five minutes, the chloridizer was completely expelled from the charge before ten minutes' time had elapsed between the time of charging and the time of sampling the extraction of the lead at the ten minute sample was about 75%, and there was no further extraction of the lead shown thereafter, whilst the extraction of the silver was only about 10 per cent at the ten minute sample with only very slight further extraction thereafter. These tests, as well as numerous other tests, clearly demonstrate that in such types of ores, the chloridizer is expelled from the charge before it can attack the values to an appreciable extent.

In the case of another ore containing about 82% silica insoluble and silicates of alumina with only about 8.8% combined weight of oxides of iron, aluminium, calcium and magnesium, in which the silver was apparently combined partially with lead, and partially with manganese when heated in six minutes to 1800° F. in a muffle and the heat raised so that at the end of ten minutes it was 1900° F., the chlorodizer was practically completely expelled in nine minutes and that in ten minutes a sample taken showed that all the lead and copper had been volatilized, whereas only 50% of the silver had been volatilized. On continuation of the heating for another five minutes, no appreciable extraction of the silver took place. After the said five minutes had elapsed, more chloridizer was added to the charge and the heat continued another five minutes when a sample taken showed that the extraction of the silver had increased after the addition of the chloridizer to about 75%, and the added chlorodizer was almost completely expelled. Further addition of chloridizer caused another increase of about 5% silver extraction to have taken place within five minutes after the latter addition of the chloridizer; the added chloridizer being expelled as before, no appreciable extraction of the silver took place after the last five minutes, even though the heating was prolonged about ten minutes. These tests also demonstrate the rapidity with which the chloridizer is expelled and they demonstrate that good extractions can only be obtained when the ore is heated to a suitable temperature in a comparatively short space of time, provided sufficient chloridizers are present when the ore reaches the proper temperature. In my process the ore can be heated quickly and the chloridizer is present wherever and whenever necessary. In my processes the ore is passed through a properly heated zone in which a chloridizer preferably in a gaseous or vapor form is present.

There are numerous methods by which such treatment may be accomplished. For example the ore either with or without a chloridizer may be fed by any suitable means to a furnace and the chloridizer added at any desired point or points to the ore during the passage of the ore through the furnace.

One example of a method of conducting my method in practice has been hereinbefore referred to as a large furnace. In this furnace, which is of the stack type, the ore mixed with a little sodium chloride was delivered at the top of the stack and removed through a revolving furnace connected with the base of the stack. The stack was heated by means of an oil burner located a little above the connection to the revolving furnace. The revolving furnace was heated at the end furtherest away from the stack furnace by means of a small burner. At a point below where the ore was fed to the furnace was located a chloridizer feeding device which in this case consisted of a spray nozzle through which a chloridizer solution was delivered. The ore on dropping into the furnace became wetted with the chloridizer solution and on passing still further down the furnace, part of the excess water was vaporized, leaving crystals of the chloridizer attached to particles of the ore. The ore and its added chloridizer dropped to the hotter zones of the furnace when the values were chloridized and subsequently volatilized before the chloridizer had been completely removed from the ore. The excess of the chloridizer was also volatilized and on ascending the stack furnace, it was available in the form of vapor to combine with the values of descending ore, thus creating a highly desirable effect practically causing each little particle of descending ore to be surrounded by a heated chloridizing atmosphere which caused the ore to be rapidly chloridized. The ore required but a few seconds to reach the bottom of the stack and it then entered the revolving furnace through which it passed in about ten minutes to the fire and discharge end and subsequently discharged. The revolving furnace acted as a discharge device and could be replaced by means of any other suitable conveying or discharging device. It was installed for the purpose of allowing more treatment time if necessary than that required for the ore to drop down through the stack furnace. With some ores the time consumed in falling down through the stack would be ample to effect the extraction of the values and with other types to avoid an excess amount, further treatment may take place in the rotating furnace. Provisions were made in the construction of the furnace to permit the chloridizer to be added to the furnace at numerous points along the route traveled by the ore, should additions be required. The volatilized values, including the products of combustion were carried from the furnace through a flue and introduced after cooling to the suction side of a fan from which it was discharged into the base of towers filled with limestone and provided with a spray at the top. The ascending gases on passing through the porous fill of the tower and on coming in contact with the descending solution were cleansed of their suspending values and chlorine compounds. The solution containing the values was treated by well known means to recover the values and the resulting solution containing recovered chloridizer was fed to the furnace to treat other ore. Small deficiencies of chloridizer were made up by adding salt to the ore. Other means of recovering the volatilized values could of course be used with this process, for example, bag houses or electrostatic precipitators.

This method will permit the treatment of ores containing more sulphur than could be treated by other methods because as the chloridizer need not be added, unless desirable, to the ore until the ore had been roasted. This method will also permit of the treatment of ores in which the values are encased in casings such as quartz, because the ore can be heated sufficiently to crack the casing, thereby exposing the encased value to the action of the chloridizer before adding the chloridizer. It will save fuel because the ore can be slowly heated or rapidly heated as desired and the difference between the temperature of the ore entering the furnace and the gases leaving the furnace may be reduced to a very small amount without harm as the chloridizer need not be added if desired, until the ore has been brought up to the desired temperature. In the case of the said large furnace, the temperature of the gases leaving the furnace was about 300° F. and the indications were that they could have been drawn off at lower temperatures without harm. In this process the ore may be fed wet or dry to the furnace and either with or without added chloridizers and the chloridizers may be either in the form of a solid, gas or a solution.

It is obvious to those skilled in the art that this process is of such a nature that numerous modifications may be made along varying lines without departing from the spirit hereof. For example the ore may be fed to a long revolving furnace fired on the discharge end and the chloridizer may be introduced to the furnace near the discharge, which procedure would permit the temperature of the gases leaving the furnace to be low, thereby insuring low fuel consumption and at the same time eliminate the heretofore harmful consequence of slow heating and therefore produce good results.

Having thus described my invention, what I claim and desire to secure by Letters Patent is—

1. A method of chloridizing volatilization which consists of heating a mixture of ore and chloridizer in a furnace and supplying an additional chloridizer in the form of a solution during the heat treatment of the ore to volatilize the values.

2. A method of chloridizing volatilization, which consists in dropping the ore through a heated stack and spraying the ore as it drops with a chloride solution.

3. A method of chloridizing volatilization which consists in dropping the ore in a ground condition through a heated stack, spraying a chloride solution into the lower end of the stack to permit said solution to volatilize to form a chloridizing gas, and spraying the entering ground ore with a chloride solution.

HARAI R. LAYNG.